United States Patent
Song et al.

(10) Patent No.: US 11,568,243 B2
(45) Date of Patent: Jan. 31, 2023

(54) METHOD AND APPARATUS WITH NEURAL NETWORK CONVOLUTION OPERATIONS

(71) Applicant: SAMSUNG ELECTRONICS CO., LTD., Suwon-si (KR)

(72) Inventors: Joonho Song, Hwaseong-si (KR); Namjoon Kim, Anyang-si (KR); Sehwan Lee, Suwon-si (KR); Deokjin Joo, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 659 days.

(21) Appl. No.: 16/704,290

(22) Filed: Dec. 5, 2019

(65) Prior Publication Data

US 2020/0193293 A1    Jun. 18, 2020

(30) Foreign Application Priority Data

Dec. 12, 2018 (KR) .......................... 10-2018-0160342

(51) Int. Cl.
  *G06N 3/08* (2006.01)
  *G06F 7/74* (2006.01)
  *G06N 20/00* (2019.01)

(52) U.S. Cl.
  CPC ............... *G06N 3/08* (2013.01); *G06F 7/74* (2013.01); *G06N 20/00* (2019.01)

(58) Field of Classification Search
  CPC ........ G06N 3/08; G06N 20/00; G06N 3/0454; G06N 3/10; G06F 7/74
  See application file for complete search history.

(56) References Cited

U.S. PATENT DOCUMENTS 5,630,024 A  *  5/1997  Aihara ................. G06N 3/0481
                                                      706/41
2018/0129893 A1    5/2018  Son et al.
(Continued)

FOREIGN PATENT DOCUMENTS

KR    10-2018-0050928 A    5/2018
KR    10-2018-0073314 A    7/2018

OTHER PUBLICATIONS

Lin, Yingyan, et al. "PredictiveNet: An Energy-Efficient Convolutional Neural Network Via Zero Prediction." 2017 *IEEE International Symposium On Circuits And Systems* (ISCAS). IEEE, 2017. (4 pages, in English).

(Continued)

*Primary Examiner* — Yosef K Laekemariam
(74) *Attorney, Agent, or Firm* — NSIP Law

(57) ABSTRACT

A processor-implemented method of performing convolution operations in a neural network includes generating a plurality of first sub-bit groups and a plurality of second sub-bit groups, respectively from at least one pixel value of an input feature map and at least one predetermined weight, performing a convolution operation on a first pair that includes a first sub-bit group including a most significant bit (MSB) of the at least one pixel value and a second sub-bit group including an MSB of the at least one predetermined weight, based on the plurality of second sub-bit groups, obtaining a maximum value of a sum of results for convolution operations of remaining pairs excepting the first pair, and based on a result of the convolution operation on the first pair and the maximum value, determining whether to perform the convolution operations of the remaining pairs.

20 Claims, 7 Drawing Sheets

(56) References Cited

U.S. PATENT DOCUMENTS

2018/0181838 A1    6/2018    Yang et al.
2018/0204120 A1*   7/2018    Rei .......................... G06N 3/04

OTHER PUBLICATIONS

Akhlaghi, Vahideh, et al. "Snapea: Predictive Early Activation For Reducing Computation In Deep Convolutional Neural Networks." 2018 ACM/IEEE 45th Annual International Symposium on Computer Architecture (ISCA). IEEE, 2018. (12 pages, in English).

Lee, Dongwoo, et al. "ComPEND: Computation Pruning through Early Negative Detection for ReLU in a deep neural network accelerator." Proceedings of the 2018 International Conference on Supercomputing. ACM, 2018. (10 pages, in English).

Lee, Dongwoo, et al. "ComPEND: Computation Pruning through Early Negative Detection for ReLU in a Deep Neural Network Accelerator." *Proceedings of the 2018 International Conference on Supercomputing*. ACM, 2018. Presentation slides. (34 pages, in English).

\* cited by examiner

METHOD AND APPARATUS WITH NEURAL NETWORK CONVOLUTION OPERATIONS

CROSS-REFERENCE TO RELATED APPLICATIONS

This application claims the benefit under 35 USC 119(a) of Korean Patent Application No. 10-2018-0160342, filed on Dec. 12, 2018, in the Korean Intellectual Property Office, the entire disclosure of which is incorporated herein by reference for all purposes.

BACKGROUND

1. Field

The following description relates to a method and apparatus with neural network convolution operations.

2. Description of the Related Art

Devices that run neural networks may perform large amounts of calculation on complex input data.

In general, many neural networks use a rectified linear unit (ReLU) activation function that returns zero for every negative input value and returns the input value itself for every positive input value. In this example, the amounts of calculation may be effectively reduced if it is possible to quickly determine whether the input value is negative.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method of performing convolution operations in a neural network includes generating a plurality of first sub-bit groups and a plurality of second sub-bit groups, respectively from at least one pixel value of an input feature map and at least one predetermined weight, performing a convolution operation on a first pair that includes a first sub-bit group including a most significant bit (MSB) of the at least one pixel value and a second sub-bit group including an MSB of the at least one predetermined weight, based on the plurality of second sub-bit groups, obtaining a maximum value of a sum of results for convolution operations of remaining pairs excepting the first pair, and based on a result of the convolution operation on the first pair and the maximum value, determining whether to perform the convolution operations of the remaining pairs.

In response to the result of the convolution operation on the first pair being positive, the convolution operations of the remaining pairs may be performed regardless of the maximum value.

In response to the result of the convolution operation on the first pair being negative and a sum of the maximum value and the result of the convolution operation on the first pair being less than zero, the determining may include outputting zero, without performing the convolution operations on the remaining pairs, as a result of the convolution operations on the remaining pairs.

In response to the result of the convolution operation on the first pair being negative and a sum of the maximum value and the result of the convolution operation on the first pair being greater than zero, the determining may include performing the convolution operations of the remaining pairs, and outputting a sum of the result of the convolution operation on the first pair and results of the convolution operations of the remaining pairs.

In response to a value corresponding to the second sub-bit group including the MSB of the at least one predetermined weight being positive, the maximum value may include a result of a first operation between the second sub-bit group including the MSB of the at least one predetermined weight and a maximum of values corresponding to a remainder of the plurality of first sub-bit groups excepting the first sub-bit group including the MSB of the at least one pixel value.

The maximum value may further include a result of a second operation between a maximum value of values corresponding to the plurality of first sub-bit groups and a remainder of the plurality of second sub-bit groups excepting the second sub-bit group including the MSB of the at least one predetermined weight.

The generating may include generating N first sub-bit groups by dividing the at least one pixel value into k-bit units, where k and N respectively refer to arbitrary natural numbers, and generating M second sub-bit groups by dividing the at least one predetermined weight into k-bit units, where M refers to an arbitrary natural number.

The at least one predetermined weight may be represented in two's complement fixed point format.

In response to the input feature map including a plurality of input feature map batches, the method may further include adjusting the plurality of input feature map batches such that first sub-bit groups including MSBs of pixel values of the plurality of input feature map batches form one of the plurality of input feature map batches.

The batches of the plurality of input feature map batches may be generated by dividing the input feature map in a channel direction.

The pixel value and the predetermined weight may include eight bits, and the sub-bit groups of each pixel value and the sub-bit groups of the predetermined weight may include four bits.

The maximum value may be obtained as an arbitrary pixel value, or may be obtained experimentally.

In another general aspect, a non-transitory computer-readable storage medium stores instructions that, when executed by a processor, cause the processor to perform the method described above.

In another general aspect, an apparatus for performing convolution operations in a neural network includes one or more processors, and a memory storing instructions, which when executed by the one or more processors configure the one or more processors to generate a plurality of first sub-bit groups and a plurality of second sub-bit groups, respectively from at least one pixel value of an input feature map and at least one predetermined weight, perform a convolution operation on a first pair that includes a first sub-bit group including a most significant bit (MSB) of the at least one pixel value and a second sub-bit group including an MSB of the at least one predetermined weight, based on the plurality of second sub-bit groups, obtain a maximum value of a sum of results for convolution operations of remaining pairs excepting the first pair, and based on a result of the convolution operation on the first pair and the maximum value, determine whether to perform the convolution operations of the remaining pairs.

In response to the result of the convolution operation on the first pair being positive, the one or more processors may be configured to perform the convolution operations on the remaining pairs regardless of the maximum value.

In response to the result of the convolution operation on the first pair being negative and a sum of the maximum value and the result of the convolution operation on the first pair being less than zero, the one or more processors may be configured to output zero, without performing the convolution operations on the remaining pairs, as a result of the convolution operations on the remaining pairs.

In response to the result of the convolution operation on the first pair being negative and a sum of the maximum value and the result of the convolution operation on the first pair being greater than zero, the one or more processors may be configured to perform the convolution operations of the remaining pairs, and output a sum of the result of the convolution operation on the first pair and results of the convolution operations of the remaining pairs.

In response to a value corresponding to the second sub-bit group including the MSB of the at least one predetermined weight being positive, the maximum value may include a result of a first operation between the second sub-bit group including the MSB of the at least one predetermined weight and a maximum of values corresponding to a remainder of the plurality of first sub-bit groups excepting the first sub-bit group including the MSB of the at least one pixel value.

The maximum value may further include a result of a second operation between a maximum value of values corresponding to the plurality of first sub-bit groups and a remainder of the plurality of second sub-bit groups excepting the second sub-bit group including the MSB of the at least one predetermined weight.

The one or more processors may be configured to generate N first sub-bit groups by dividing the at least one pixel value into k-bit units, where k and N respectively refer to arbitrary natural numbers, and to generate M second sub-bit groups by diving the at least one predetermined weight into k-bit units, where M refers to an arbitrary natural number.

The at least one predetermined weight may be represented in two's complement fixed point format.

In response to the input feature map including a plurality of input feature map batches, the one or more processors may be further configured to adjust the plurality of input feature map batches such that first sub-bit groups including MSBs of pixel values of the plurality of input feature map batches form one of the plurality of input feature map batches.

The pixel value and the predetermined weight may include eight bits, and the sub-bit groups of the pixel value and the sub-bit groups of the predetermined weight may include four bits.

The maximum value may be obtained as an arbitrary pixel value, or may be obtained experimentally.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
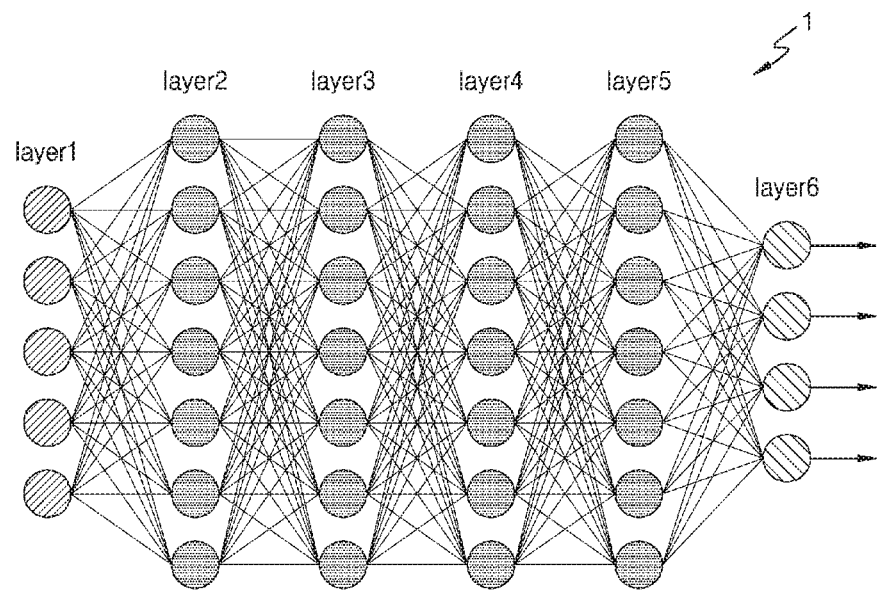
FIG. 1 is a view illustrating an example of a network architecture.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise.

The features of the examples described herein may be combined in various ways as will be apparent after an understanding of the disclosure of this application. Further, although the examples described herein have a variety of configurations, other configurations are possible as will be apparent after an understanding of the disclosure of this application.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. Expressions such as "at least one of," when preceding a list of elements, modify the entire list of elements and do not modify the individual elements of the list.

Unless otherwise defined, all terms, including technical and scientific terms, used herein have the same meaning as commonly understood by one of ordinary skill in the art to which this disclosure pertains and in view of the disclosure of this application. Terms, such as those defined in commonly used dictionaries, are to be interpreted as having a meaning that is consistent with their meaning in the context of the relevant art and consistent with the disclosure of this application, and are not to be interpreted in an idealized or overly formal sense unless expressly so defined herein.

In the following descriptions of the embodiments, when a portion or element is referred to as being connected to another portion or element, the portion or element may be directly connected to the other portion or element, or may be electrically connected to the other portion or elements with intervening portions or elements being therebetween. It will be further understood that the terms "comprises" and/or "comprising" used herein specify the presence of stated features or elements, but do not preclude the presence or addition of one or more other features or elements.

In the following descriptions of the embodiments, expressions or terms such as "constituted by," "formed by," "include," "comprise," "including," and "comprising" should not be construed as always including all specified elements, processes, or operations, but may be construed as not including some of the specified elements, processes, or operations, or further including other elements, processes, or operations.

Herein, it is noted that use of the term "may" with respect to an example or embodiment, e.g., as to what an example or embodiment may include or implement, means that at least one example or embodiment exists where such a feature is included or implemented while all examples and embodiments are not limited thereto.

FIG. 1 is a view illustrating an example of a network architecture.

Referring to the example of FIG. 1, a neural network 1 may be an example of a deep neural network (DNN). As non-limiting examples, the DNN may be, but is not limited to, a convolutional neural network (CNN), a recurrent neural network (RNN), or another type of DNN. A DNN is a neural network with multiple layers between the input and output layers. For example, the neural network 1 may be a DNN including an input layer 1, four hidden layers 2, 3, 4, and 5, and an output layer 6.

When the neural network 1 is implemented by using a DNN architecture, the neural network 1 may include a plurality of layers capable of processing information. Thus, the neural network 1 may process more complex data sets, as a DNN, than a neural network having only a single layer. Although the example of FIG. 1 illustrates that the neural network 1 includes six layers, this is merely an example. For example, the neural network 1 may include fewer or more layers, although the neural network 1 may include at least two hidden layers, in an example DNN architecture. That is, the neural network 1 may include variously structured layers different from the layers shown in FIG. 1. Also, though illustrated as having similar numbers of nodes and connections, there may also be variations in examples of the neural network 1, with respect to the number of nodes included in each layer and connections with themselves and other layers.

Figure 2:
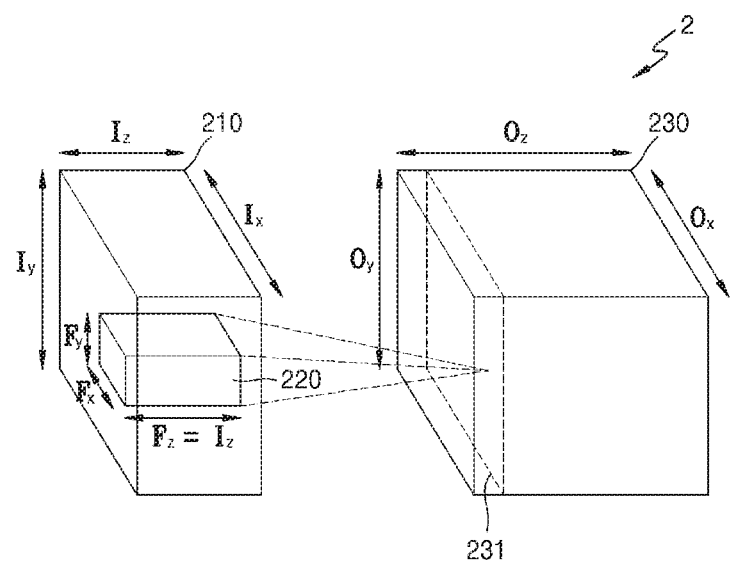
FIG. 2 is a view illustrating an example of a convolution layer.

FIG. 2 is a view illustrating an example of a convolution layer 2.

FIG. 2 illustrates a portion of the convolution layer 2. In addition to the convolution layer 2 shown in FIG. 2, a neural network may further include a pooling layer, a fully connected layer, or the like. Such a pooling layer may reduce the spatial size of the representation to reduce the amount of parameters and computation in the network. Referring to the example of FIG. 2, the convolution layer 2 may include an input feature map 210 having a size of Ix×Iy×Iz, a weight filter 220 having a size of Fx×Fy×Iz, and an output feature map 230 having a size of Ox×Oy×Oz. Here, the illustrated weight filter 220 is representative of one or more such weight filters 220, each being a respective kernel having number of slices or channels corresponding to the number of slices or channels of the input feature map 210, e.g., as demonstrated the input feature map 210 and the weight filter 220 have a same Iz dimension. The output feature map 230 will have one or more output slices or channels corresponding to the number of the one or more weight filters 220, e.g., Oz may correspond to the ultimate number of weight filters 220 applied in the convolution of the input feature map 230. For example, when a single weight filter 220 is applied, only the single slice or channel 231 may result from the convolution operation.

The input feature map 210, the weight filter 220, and the output feature map 230 may respectively include input pixel values, weights, and output pixel values. The convolution operation may be respectively performed on the input feature map 210 using plural weight filters 220. As a result, the output feature map 230 may be generated. For example, the convolution operation may be performed on the input feature map 210 and a particular weight filter 220 by a sliding window method according to a predetermined stride. For example, input pixel values within a window may be respectively multiplied by the weights of the weight filter 220, the window may be slid or rastered across the input feature map 210 dependent on the predetermined stride, and the products of the multiplications may then be summed. If the particular weight filter 220 is the first such weight filter 220, then the result of the summations will be represented in the slice or channel 231 of the output feature map 230. The remaining slices or channels of the output feature map 230 will each be similarly calculated through the similar sliding method with respect to the remaining corresponding weight filters 220. The output feature map 230, resulting from the above convolutional operation, may then be considered an input feature map 210 for a next convolutional layer, where the convolution operations of that next convolutional layer may be performed on that input feature map 210 for the next convolutional layer using corresponding weight filters 220 for that next convolutional layer. Accordingly, such convolution operations may thus be repeated through multiple respective convolutional layers.

The above-described operations may be simply expressed as the sum of products between input pixel values and weights. The following Equation 1 expresses the sum of N products between input pixel values x and weights w, written compactly.

$$S = \sum_{i=1}^{N} w_i \times x_i \qquad \text{Equation 1}$$

In Equation 1 above, $x_i$ denotes an i-th input pixel value, $w_i$ denotes an i-th weight, and S denotes the sum of products between input pixel values and weights.

For example, in the neural network, an activation function may be applied to the sum of multiplication products to impart nonlinearity to the neural network. In the neural network, an input value to a rectified linear unit (ReLU) activation function may be the resultant value of an operation in the convolution layer 2 or the fully connected layer. The ReLU activation function is defined as being f(x)=max (0, x), which returns zero for every negative input value and returns the input value itself for every positive input value. Thus, at the point it is known a final resultant value of an operation will be a negative value, before the operation is completed, the ultimate total number of calculations may be reduced, in that the activation function can be immediately known to be zero, and thus further consideration and/or processing are not necessary to establish the actual (negative) value to which the ReLU function would be applied. A neural network apparatus of the present example may use techniques to quickly determine whether the final sum of multiplications is negative before the summing of multiplications is completed. Therefore, the speed of operations may be improved, by avoiding unnecessary calculation and processing. Hereinafter, examples showing the operation of the neural network apparatus are described further with reference to FIGS. 3 to 9.

Figure 3:
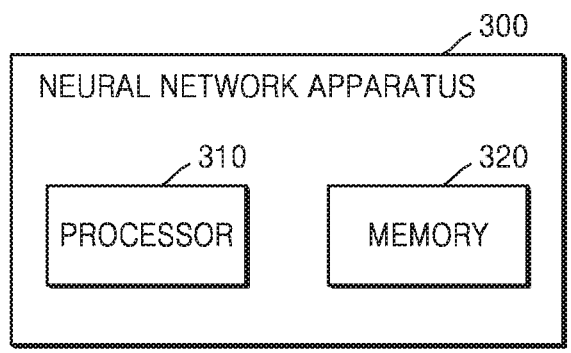
FIG. 3 is a block diagram illustrating an example configuration of a neural network apparatus.

FIG. 3 is a block diagram illustrating an example configuration of a neural network apparatus 300.

The neural network apparatus 300 may be variously implemented as a device such as a personal computer (PC), a server, a mobile device, or an embedded device. For example, the neural network apparatus 300 may be implemented as a smartphone, a tablet device, an augmented reality (AR) device, an Internet of things (IoT) device, an autonomous vehicle, a robot, a medical device, or another electronic device that is configured for voice recognition, image recognition, image sorting, or a similar task, using one or more respective neural networks. However, the neural network apparatus 300 is not limited to such examples, and other hardware may be used in various examples, and may perform different tasks which may be accomplished by the use of a neural network. In addition, the neural network apparatus 300 may correspond to a dedicated hardware (HW) accelerator included in such a device. For example, the neural network apparatus 300 may be an HW accelerator such as a neural processing unit (NPU), a tensor processing unit (TPU), or a neural engine that is a dedicated module for running a neural network. Such a dedicated HW accelerator may include processing hardware that is particularly adapted and/or designed to carry out operations for neural network training and/or inference implementations quickly and efficiently. However, the neural network apparatus 300 is not limited thereto, and the neural network apparatus 300 may include a variety of hardware, whether generalized or specialized, that is capable of representing, storing, and training a DNN.

Referring to the example of FIG. 3, the neural network apparatus 300 may include a processor 310 and a memory 320. Components related to such an example are shown in the neural network apparatus 300 of FIG. 3, but such components are not intended to be taken as exclusive. Therefore, the neural network apparatus 300 may further include general components or other relevant components, in addition to the components shown in FIG. 3.

The processor 310 may perform a convolution operation on input feature map data and weight data. In addition, the processor 310 may control the operation of the neural network apparatus 300 with respect to the convolution and/or as a whole by executing respective instructions stored in the memory 320 of the neural network apparatus 300. For example, the processor 310 may be implemented as a central processing unit (CPU), a graphics processing unit (GPU), an application processor (AP), or another general-purpose or special-purpose processor provided in the neural network apparatus 300. However, the processor 310 is not to be limited by these specific examples, and in examples, one or more processors of various types are used as the processor 310.

The memory 320 may be hardware storing various data in the neural network apparatus 300. The memory 320 may store data already processed in the neural network apparatus 300 and data waiting to be processed in the neural network apparatus 300. For example, the memory 320 may store input feature map data, weight data, and the like. That is, the memory 320 may be used to record the information that represents the parameters, as well as structure, of the neural network. In addition, the memory 320 may store applications, drivers, and the like to be executed by the neural network apparatus 300. Examples of the memory 320 may include a random access memory (RAM), such as a dynamic random access memory (DRAM) and a static random access memory (SRAM), a read-only memory (ROM), an electrically erasable programmable read-only memory (EEPROM), a Blu-ray disc or other optical disk storages, a hard disk drive (HDD), a solid state drive (SSD), and a flash memory. However, the memory 320 is not limited to these particular types of memory 320, and various types of non-volatile memory, volatile memory, and combinations of non-volatile memory and volatile memory may be used in various examples.

The processor 310 may read/write data processed in the neural network apparatus 300, such as input feature map data, weight data, or output feature map data, from/in the memory 320. Also, the processor 310 may operate the neural network apparatus 300 using the read/written data. For example, the processor 310 may iteratively perform a convolution operation between input feature map data and weight data to generate output feature map data. At this time, the extent or total potential number of calculations of the convolution operation may be determined depending on various factors, such as the number of input feature map channels, the number of weight channels, the size of input feature maps, the size of weights, or the precision of values. However, these factors are only examples, and other relevant factors may be used to establish the extent or total potential number of calculations of the convolution operation. Unlike the neural network 1 shown in the example of FIG. 1, an actual neural network, which is driven by the neural network apparatus 300, may be implemented with a more complicated architecture. Accordingly, the processor 310 may perform convolution operations requiring large amounts of calculations, corresponding to high operation counts, ranging from hundreds of millions of operation counts to tens of billions of operation counts. Thus, the frequency at which the processor 310 accesses the memory 320 for the convolution operations may increase dramatically. However, methods of reducing calculation burdens may be desirable for mobile devices such as smart phones, tablets, and wearable devices, embedded devices, or similar electronic devices, which have relatively low processing resources, and may accordingly reduce the number of memory calls. Moreover, such electronic devices are often powered by a battery, and if the electronic devices are required to do extensive amounts of processing, such processing may quickly deplete battery resources, causing problems with the ongoing operation of the electronic devices.

The processor 310 may generate a plurality of first sub-bit groups and a plurality of second sub-bit groups, respectively, from at least one pixel value of an input feature map and at least one weight. For example, the processor 310 may divide at least one pixel value into k-bit units, where k refers to an arbitrary natural number, to generate N sub-bit groups, where N is an arbitrary natural number. The processor 310 may also divide at least one weight into k-bit units to generate M sub-bits groups, where M is an arbitrary natural number. In addition, weights may be previously determined through neural network learning processes.

The processor 310 may first perform a convolution operation on a first pair that includes a first sub-bit group including the most significant bit (MSB) of the at least one pixel value and a second sub-bit group including the MSB of the at least one weight.

Based on the plurality of second sub-bit groups, the processor 310 may obtain the maximum value of the sum of resultant values of convolution operations on remaining pairs, other than the first pair. For example, the maximum value may be previously calculated and stored in the memory 320, and the processor 310 may accordingly obtain the previously stored maximum value by accessing the memory 320.

Based on the resultant value of the convolution operation on the first pair and the obtained maximum value, the processor 310 may determine whether to perform convolution operations on the remaining pairs.

When the resultant value of the convolution operation on the first pair is a positive value, the processor 310 may perform a convolution operation on each of the remaining pairs, regardless of the maximum value of the sum of resultant values of convolution operations on the remaining pairs.

When the resultant value of the convolution operation on the first pair is a negative value and the sum of the maximum value and the resultant value of the convolution operation on the first pair is less than zero, the processor 310 may not perform convolution operations on the remaining pairs and may output zero. In this example, the amount of convolution operations performed in the neural network may be reduced with a ratio of up to 1/(N*M), in that unnecessary convolution operations may be avoided because determining that the resultant value of the convolution operation on the first pair is a negative value and the sum of the maximum value and the resultant value of the convolution operation on the first pair is less than zero allows an immediate decision that certain calculations can be avoided.

When the resultant value of the convolution operation on the first pair is a negative value and the sum of the maximum value and the resultant value of the convolution operation on the first pair is greater than zero, the processor 310 may perform convolution operations on the remaining pairs. In this example, the processor 310 may output the sum of the resultant value of the convolution operation on the first pair and the resultant values of the convolution operations on the remaining pairs.

In addition, when an input feature map includes a plurality of input feature map batches, the processor 310 may operate such that first sub-bit groups including the MSBs of pixel values of the plurality of input feature map batches may form one of the plurality of input feature map batches. Accordingly, even when an input feature map includes a plurality of input feature map batches, it may be determined, without performing convolution operations on up to the final input feature map batch, whether to perform convolution operations on remaining pairs.

Therefore, operation efficiency may be maintained.

Figure 4:
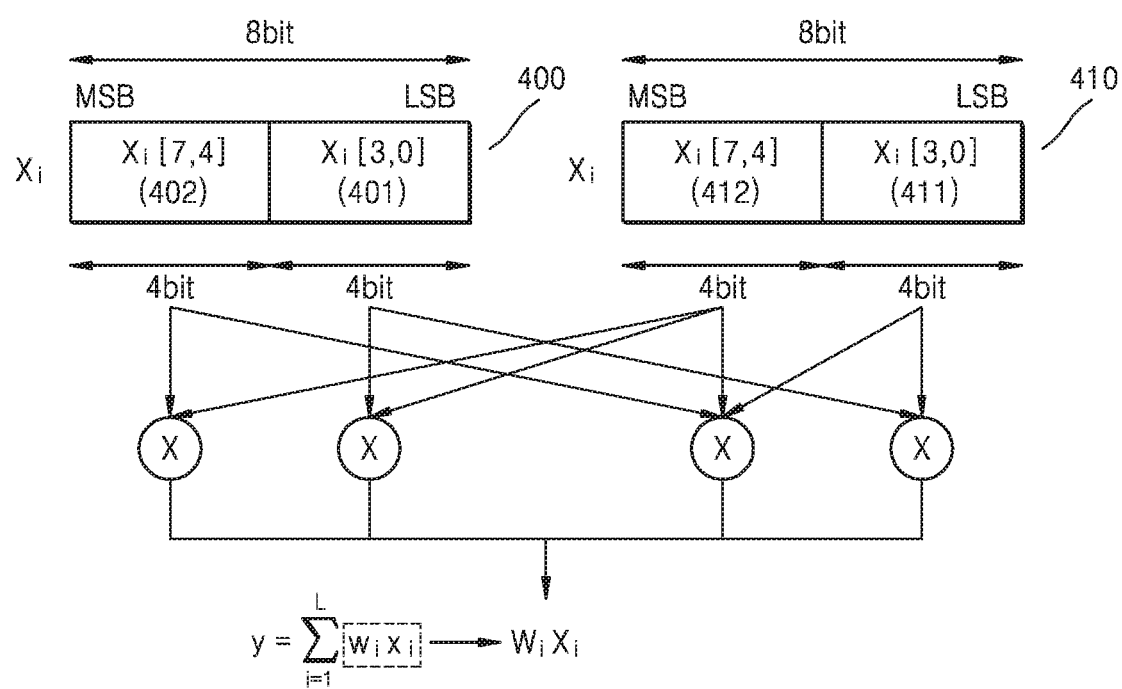
FIG. 4 is a view illustrating an example in which a convolution operation is performed by generating a plurality of sub-bit groups from a pixel value of an input feature map and a weight.

FIG. 4 is a view illustrating an example in which a convolution operation is performed by generating a plurality of sub-bit groups from a pixel value of an input feature map and a weight.

Referring to the example of FIG. 4, the processor 310 may generate a plurality of sub-bit groups from each of a pixel value 400 of an input feature map and an associated weight 410.

The pixel value 400 of the input feature map and the weight 410 may be represented in a fixed point format. Such a fixed point format is a method of representing numerical values that assumes that the decimal point is fixed. Each of the pixel value 400 of the input feature map and the weight 410 may be represented using 8 bits, as shown in the example of FIG. 4. However, the pixel value 400 of the input feature map and the weight 410 are not limited to an 8-bit representation, and may be expressed using various numbers of bits.

The pixel value 400 of the input feature map is a value that has passed through a ReLU activation function, or equivalent settling upon a pre-activation determination of final negative signage, in the previous layer. The pixel value 400 is thus zero or a positive number. In addition, the weight 410 may correspond to a negative value. Accordingly, the weight 410 may be represented in two's complement fixed point format. In the two's complement fixed point format, the MSB may be used to denote a negative sign, and the remaining bits may be used to denote a positive number.

In the example of FIG. 4, the processor 310 may perform a convolution operation between an input feature map and L weights corresponding to the input feature map by calculating the sum of multiplications between L pixel values of the input feature map and the L weights respectively corresponding to the L pixel values. A final result value y of the convolution operation may correspond to a pixel value of an output feature map.

Referring to the example of FIG. 4, the processor 310 may divide the pixel value 400 of the input feature map into four-bit units to generate two first sub-bit groups 401 and 402. The processor 310 may perform this dividing process on each of the L pixel values of the input feature map. In addition, the processor 310 may divide the weight 410 into four-bit units to generate two second sub-bit groups 411 and 412. The processor 310 may perform this dividing process on each of the L weights, respectively corresponding to the L pixel values.

In addition, the bit units into which the pixel value 400 of the input feature map and the weight 410 are divided by the processor 310 are not limited to the above example, and other approaches to dividing the pixel value 400 of the input feature map and the weight 410 are used in other examples. That is, various bit units may be possible.

The first sub-bit group 401 may include zeroth to third bits of the pixel value 400 of the input feature map, and the first sub-bit group 402 may include fourth to seventh bits of the pixel value 400 of the input feature map. Such grouping is in accordance with the example presented above.

Similarly, the second sub-bit group 411 may include zeroth to third bits of the weight 410, and the second sub-bit group 412 may include fourth to seventh bits of the weight 410.

The processor 310 may perform a multiplication operation between the pixel value 400 of the input feature map and the weight 410 by performing a multiplication operation on a pair including the first sub-bit group 402 and the second sub-bit group 412, a pair including the first sub-bit group 402 and the second sub-bit group 411, a pair including the first sub-bit group 401 and the second sub-bit group 412, and a pair including the first sub-bit group 401 and the second sub-bit group 411.

In such an example, the first sub-bit group 402 may include the MSB of the pixel value 400 of the input feature map, and the second sub-bit group 412 may include the MSB of the weight 410. Thus, the result of the multiplication operation on the pair of the first sub-bit group 402 and the second sub-bit group 412 may mostly contribute to the result of the multiplication operation between the pixel value 400 of the input feature map and the weight 410.

Thus, in a convolution operation between an input feature map and weights corresponding to the input feature map, it may be possible to omit many calculations, as described further, below, with reference to FIG. 5.

Figure 5:
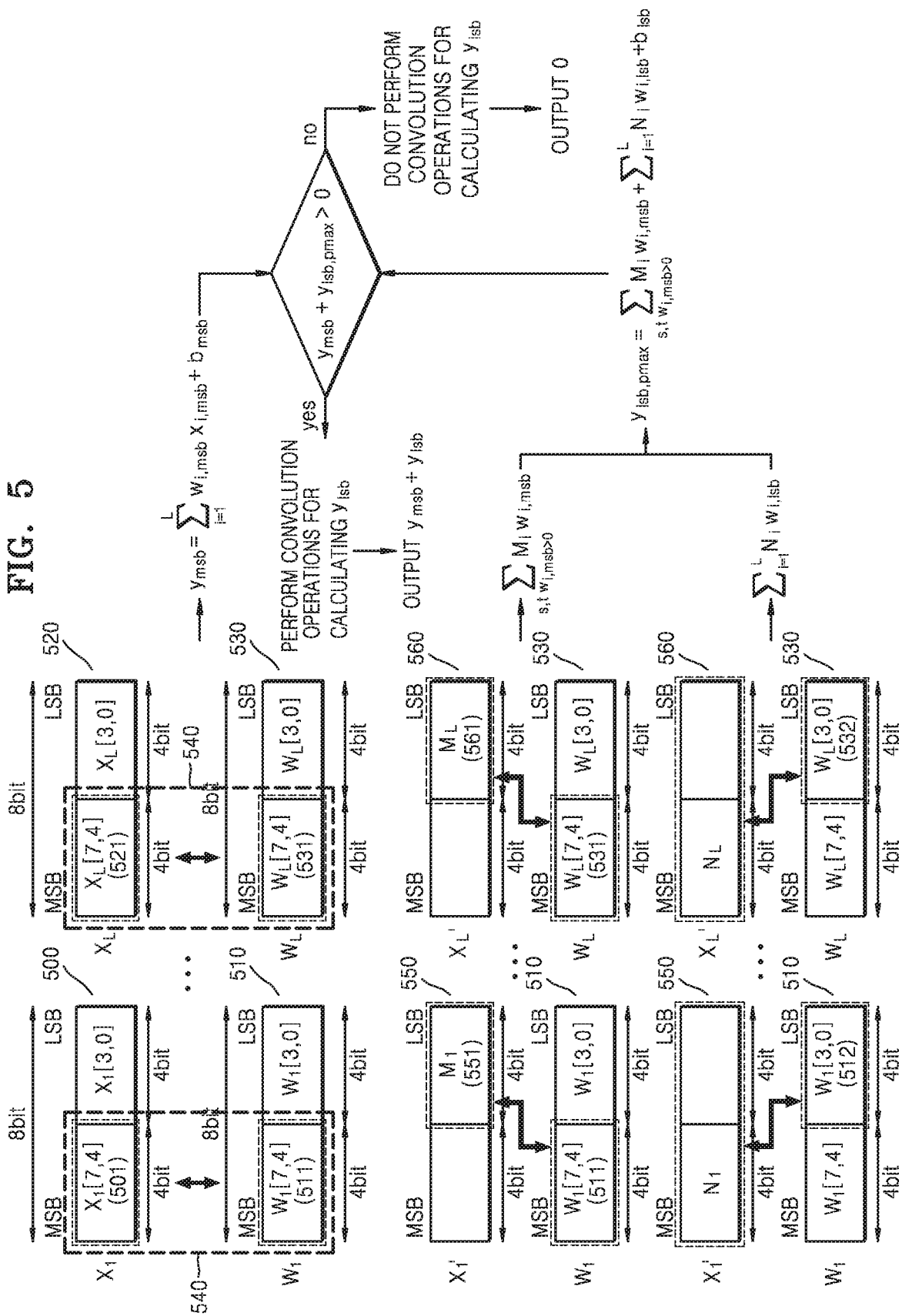
FIG. 5 is a view illustrating an example of convolution operations between an input feature map and weights corresponding to the input feature map.

FIG. 5 is a view illustrating an example of convolution operations between an input feature map and weights corresponding to the input feature map.

Referring to the example of FIG. 5, the processor 310 may perform convolution operations between L pixel values of an input feature map and L weights respectively corresponding to the pixel values. For example, each of the L pixel values of the input feature map and each of the L weights may be represented by 8 bits.

To perform the convolution operations, the processor 310 may divide each of the L pixel values of the input feature map into four-bit units to generate two first sub-bit groups, and each of the L weights into four-bit units to generate two second sub-bit groups.

First, the processor 310 may perform a convolution operation on first pairs 540, which include first sub-bit groups including the MSBs of the L pixel values and second sub-bit groups including the MSBs of the L weights.

For example, the processor 310 may perform a multiplication between a first sub-bit group 501 having the MSB of a first pixel value $X_1$ 500 of the L pixel values of the input feature map and a second sub-bit group 511 having the MSB of a first weight $W_1$ 510 of the L weights.

Similarly, the processor 310 may perform a multiplication between a first sub-bit group having the MSB of a second pixel value $X_2$ of the L pixel values and a second sub-bit group having the MSB of a second weight $W_2$ of the L weights. Finally, the processor 310 may perform a multiplication between a first sub-bit group 521 having the MSB of a last pixel value $X_L$ 520 and a second sub-bit group 531 having the MSB of a last weight $W_L$ 530. Subsequently, the processor 310 may add up the resultant values of the multiplications to obtain a resultant value $y_{msb}$ of the convolution operation on the first pairs 540. The resultant value $y_{msb}$ of the convolution operation on the first pairs 540 may be expressed by Equation 2, below.

$$y_{msb} = \Sigma_{i=1}^{L} w_{i,msb} x_{i,msb} + b_{msb}$$  Equation 2

In Equation 2, above, $w_{i,msb}$ denotes a sub-bit group having the MSB of a weight $w_i$. $x_{i,msb}$ denotes a sub-bit group having the MSB of a pixel value $x_i$ of the input feature map. $b_{msb}$ denotes a bias value.

The resultant value $y_{msb}$ of the convolution operation on the first pairs 540 may mostly contribute to the final resultant value of the convolution operations between the L pixel values of the input feature map and the L weights respectively corresponding to the L pixel values.

When the resultant value $y_{msb}$ of the convolution operation on the first pairs 540 is positive, because the final resultant value of the convolution operations is also understood to be positive, the processor 310 may perform convolution operations on remaining pairs.

By contrast, when the resultant value $y_{msb}$ of the convolution operation on the first pairs 540 is negative, the processor 310 may obtain the maximum value of the sum of resultant values of convolution operations on the remaining pairs. For example, the maximum value may be previously calculated and stored in the memory 320, and the processor 310 may obtain the previously stored maximum value from the memory 320.

In addition, the L weights used in the convolution operations may be previously determined by neural network learning processes. The maximum value may be obtained by calculating a theoretical maximum value obtainable when convolution operations are performed on pixel values of an arbitrary input feature map based on previously determined weights. Such a theoretical maximum value may be calculated as follows, using Equation 3.

$$y_{lsb,pmax} = \Sigma_{s,t \; w_{i,msb}>0} M_i w_{i,msb} + \Sigma_{i=1}^{L} N_i w_{i,lsb} + b_{lsb}$$  Equation 3

In Equation 3, above, $w_{i,msb}$ denotes a sub-bit group having the MSB of a weight $w_i$. $M_i$ denotes the maximum value of a sub-bit group of an arbitrary pixel value on which a convolution operation is performed using the $w_{i,msb}$, except for a sub-bit group having the MSB of the arbitrary pixel value. $w_{i,lsb}$ denotes a sub-bit group of the weight $w_i$ except for the sub-bit group having the MSB of the weight $w_i$. $N_i$ denotes the maximum value of an arbitrary pixel value on which a convolution operation is performed using the $w_{i,lsb}$. $b_{lsb}$ denotes a bias value.

For example, when the value corresponding to the second sub-bit group 511 including the MSB of the first weight $w_1$ 510 of the L weights is negative, the maximum value may be obtained in the example in which all bits of a sub-bit group 551 of an arbitrary pixel value $X_1'$ 550 with which an operation is performed on the second sub-bit group 511 are 0. The sub-bit group 551 may correspond to a sub-bit group of the arbitrary pixel value $X_1'$ 550 other than a sub-bit group including the MSB of the arbitrary pixel value $X_1'$ 550. When the value corresponding to the second sub-bit group 511 is positive, the maximum value may be obtained in the example in which all the bits of the sub-bit group 551 of the arbitrary pixel value $X_1'$ 550 are 1. In this example, a value $M_1$ corresponding to the sub-bit group 551 may be 1111, such that there are four bits, all of which have a value of 1.

Similarly, depending on whether the value corresponding to the second sub-bit group 531 including the MSB of the last weight $W_L$ 530 is negative or positive, a value $M_L$ corresponding to a sub-bit group 561 of an arbitrary pixel value $X_L'$, with which an operation is performed on the second sub-bit group 531, may be determined.

The value corresponding to a second sub-bit group 512 other than the second sub-bit group 511 including the MSB of the first weight $W_1$ 510 among the L weights may be only zero or a positive number. Thus, the maximum value may be obtained in an example in which all the bits of the arbitrary pixel value $X_1'$ 550 with which an operation is performed on the second sub-bit group 512 are 1. Thus, in this example, a value $N_1$ corresponding to the arbitrary pixel value $X_1'$ 550 may thus be 11111111. However, as described above, when the second sub-bit group 511, including the MSB of the weight $W_1$ 510, is negative as described above, since all the bits of the sub-bit group 551 of the arbitrary pixel value $X_1'$ 550 on which an operation is performed are 0, the value $N_1$ corresponding to the arbitrary pixel value $X_1'$ 550 may be 11110000.

Similarly, the value corresponding to a sub-bit group 532 other than the second sub-bit group 531, including the MSB of the last weight $W_L$ 530, may be only zero or a positive number, and a value $N_L$ corresponding to an arbitrary pixel value $X_L'$ 560 with which an operation is performed on the second sub-bit group 532 may be 11111111 or 11110000.

In addition, the maximum value of the sum of the resultant values of the convolution operations on the remaining pairs may be experimentally obtained instead of theoretically calculating the maximum value as described above. For example, after inputting a large number of arbitrary input feature maps to a convolution layer, the sum of resultant values of convolution operations on remaining pairs may be obtained for each of the input feature maps. In this example, the largest value of the experimentally obtained sum of the resultant values of the convolution operations on the remaining pairs may be obtained as the maximum value. While this approach may not provide an exact, theoretical answer, an experimental approach that uses a large number of arbitrary input feature maps that may have a similar result without requiring the performance of the theoretical calculations described above.

The processor 310 may determine whether to perform convolution operations on the remaining pairs, based on the resultant value $y_{msb}$ of the convolution operation on the first pairs 540 and the maximum value $y_{lsb,pmax}$, which is obtained from the memory 320 as the maximum value of the sum of the resultant values of convolution operations on the remaining pairs excepting the first pairs 540. For example, the processor 310 may calculate the sum of the resultant value $y_{msb}$ of the convolution operation on the first pairs 540 and the maximum value $y_{lsb,pmax}$. However, as described above, when the resultant value $y_{msb}$ of the convolution operation on the first pairs 540 is a positive value, the processor 310 may perform convolution operations on the remaining pairs other than the first pairs 540 without considering the maximum value $y_{lsb,pmax}$.

When the resultant value $y_{msb}$ is a negative value and the sum is less than zero, because the final result value of convolution operations between the L pixel values of the input feature map and the L weights respectively corresponding to the L pixel values is also accordingly less than zero, the processor 310 may omit convolution operations for the remaining pairs. Because the final resultant value of the convolution operations may be expected to be less than zero, if calculated, the processor 310 may merely output zero without performing convolution operations on the remaining pairs without requiring additional processing.

When the resultant value $y_{msb}$ is a negative value and the sum is greater than zero, because the final result value of convolution operations between the L pixel values of the input feature map and the L weights respectively corresponding to the L pixel values may be greater than zero, the processor 310 may perform a convolution operation on each of the remaining pairs. The processor 310 may output the sum of the resultant value of the convolution operation on the first pairs 540 and the resultant values of the convolution operations on the remaining pairs.

In addition, in other examples, each of the L pixel values of the input feature map and the L weights may be represented by various numbers of bits instead of eight bits. Also, the bit units into which the processor 310 divides each of the L pixel values and the L weights are not limited to the above description, but may be variously selected in different ways in different examples.

Figure 6:
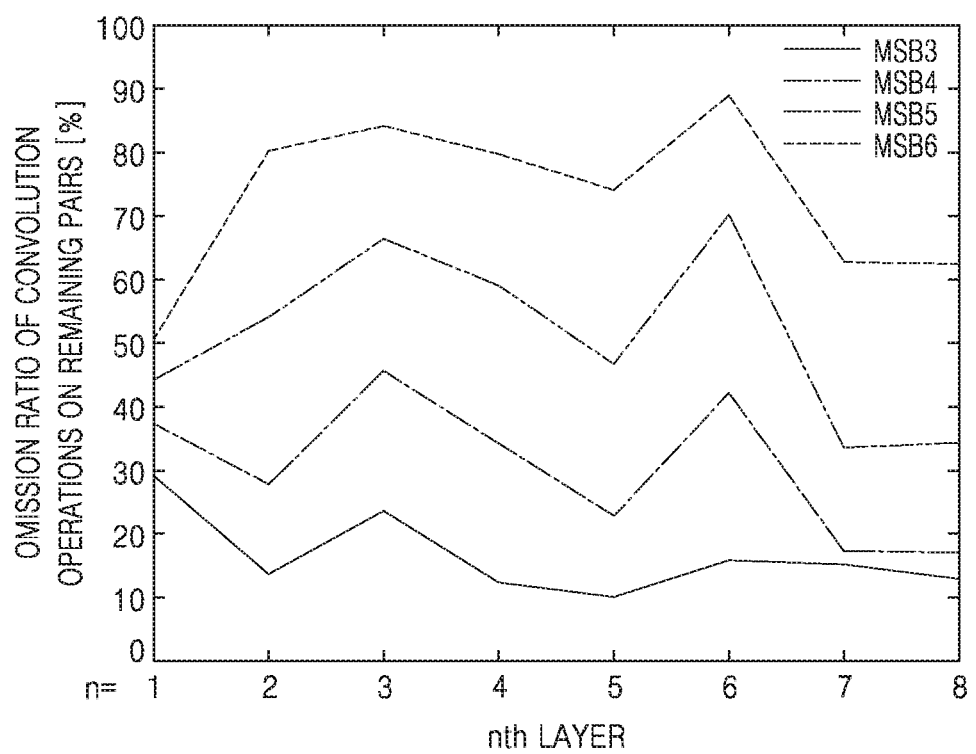
FIG. 6 is a view illustrating an omission ratio of convolution operations on remaining pairs according to the number of bits of a sub-bit group including the most significant bit (MSB) of a pixel value and the number of bits of a sub-bit group including the MSB of a weight.

FIG. 6 is a view illustrating an omission ratio of convolution operations for remaining pairs, according to the number of bits of sub-bit groups including the MSBs of pixel values and sub-bit groups including the MSB of weights.

In the graph shown in FIG. 6, MSB3, MSB4, MSB5, and MSB6 refer to the cases in which each of the sub-bit groups including the MSB of pixel values of an input feature map and the sub-bit groups including the MSBs of weights has 3, 4, 5, and 6 bits. The omission ratio of the convolution operations for the remaining pairs in an nth layer of a neural network is shown for the examples of MSB3, MSB4, MSB5, and MSB6.

As described above, when the resultant value $y_{msb}$ of the convolution operation on the first pairs is negative and the total sum of the resultant value $y_{msb}$ and the maximum value $y_{lsb,pmax}$ of the sum of the resultant values of the convolution operations on the remaining pairs except the first pairs is less than zero, the processor 310 may omit the convolution operations for the remaining pairs. Such omission, which is quantified in FIG. 6, may improve the efficiency of examples.

Referring to the examples of FIG. 6, on average, the convolution operations for the remaining pairs may be omitted at ratios of 16.70%, 30.64%, 51.19%, and 72.91% for the cases of MSB3, MSB4, MSB5, and MSB6, respectively. That is, the greater the number of bits included in the sub-bit groups including the MSBs of the pixel values and the sub-bit groups including the MSBs of the weights, the higher the omission ratio at which the convolution operations for the remaining pairs are omitted.

Figure 7:
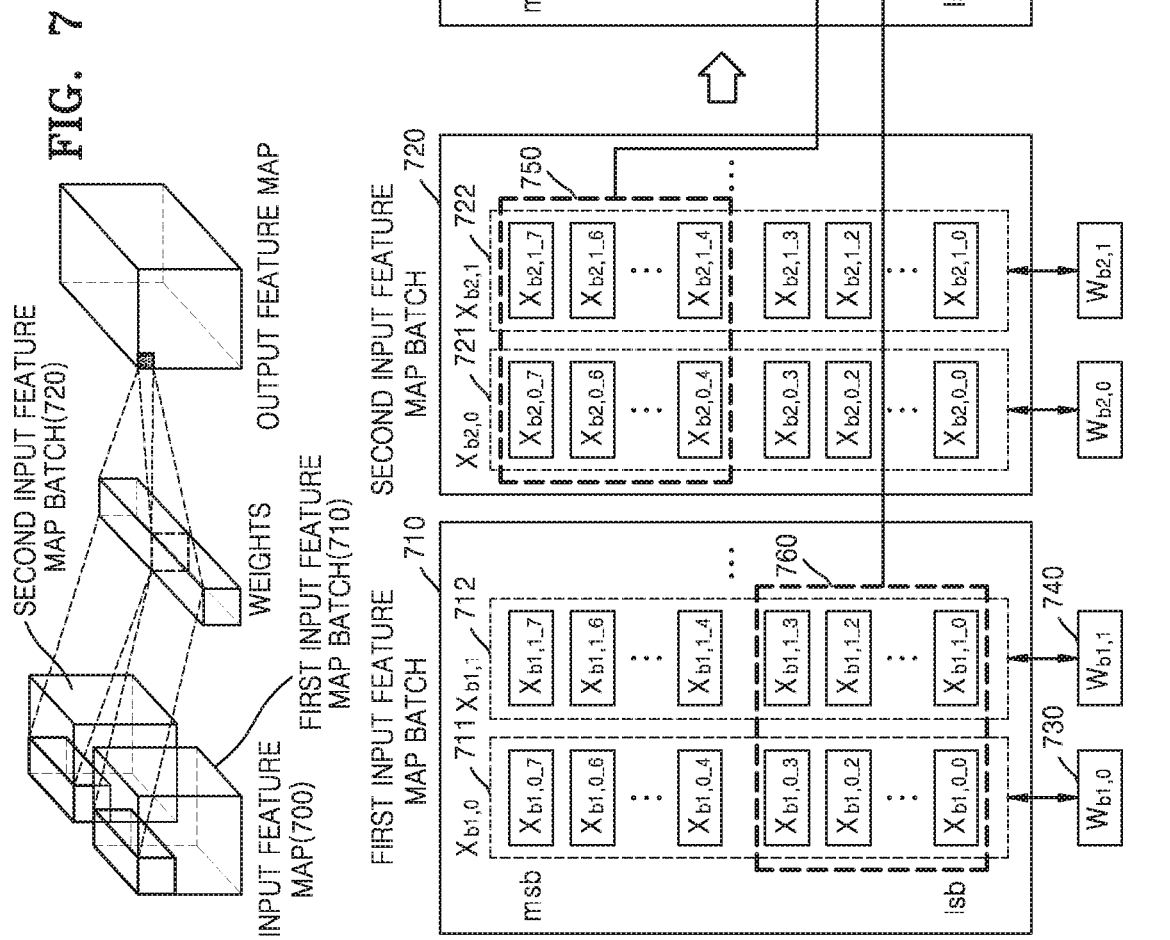
FIG. 7 is a view illustrating an example of dividing an input feature map into a plurality of input feature map batches.

FIG. 7 is a view illustrating an example of dividing an input feature map 700 into a plurality of input feature map batches.

Referring to the example of FIG. 7, the input feature map 700 may be divided into a plurality of input feature map batches. The plurality of input feature map batches may be generated by dividing the input feature map 700 in a channel direction. The input feature map 700 may be divided into the plurality of input feature map batches by considering the internal memory space of the processor 310, and a convolution operation may be performed on each of the input feature map batches.

For example, the input feature map 700 may be divided into a first input feature map batch 710 and a second input feature map batch 720. However, the input feature map 700 may be divided into various numbers of input feature map batches, and dividing the input feature map 700 is not limited to the above-described example.

For example, an operation may be performed on a zeroth pixel value $X_{b1,0}$ 711 of the first input feature map batch 710 and a zeroth weight $W_{b1,0}$ 730 of a weight batch, corresponding to the first input feature map batch 710. Similarly, an operation may be performed on a first pixel value $X_{b1,1}$ 712 of the first input feature map batch 710 and a first weight $W_{b1,1}$ 740 of the weight batch corresponding to the first input feature map batch 710. Each pixel value may be represented, in such an example, by a total of 8 bits, from a zeroth bit to a seventh bit. An operation may also be performed on pixel values of the second input feature map batch 720 and weights of a weight batch corresponding to the second input feature map batch 720.

In addition, when the convolution operation is performed on each of the plurality of input feature map batches, a determination whether to perform the convolution operation on remaining pairs, excepting first pairs including sub-bit groups including the MSBs of pixel values and sub-bit groups including the MSBs of, weights may be determined during an operation on a last input feature map batch. Thus, when the input feature map 700 is divided into the plurality of input feature map batches, the efficiency of operations may decrease.

Therefore, the processor 310 may adjust the plurality of input feature map batches such that the sub-bit groups including the MSBs of the pixel values of the plurality of input feature map batches may form one of the plurality of input feature map batches.

For example, referring to the example of FIG. 7, the processor 310 may adjust the input feature map batches such that sub-bit groups 750 including the MSBs of the pixel values of the second input feature map batch 720 may be located in the first input feature map batch 710, and sub-bit groups 760 except sub-bit groups including the MSBs of the pixel values of the first input feature map batch 710 may be located in the second input feature map batch 720. Such an approach may improve the efficiency of operations, as discussed further, below.

As a result, in the adjusted first input feature map batch 710, the sub-bit groups including the MSBs of the pixel values of the plurality of input feature map batches may be located. An operation may be performed on the sub-bit groups of the pixel values of the adjusted first input feature map batch 710 and corresponding sub-bit groups of weights to obtain the resultant value $y_{msb}$ of the convolution operation on the first pairs.

Thus, by using approaches as shown in the example of FIG. 7, it may be possible to determine whether to omit the convolution operations on the remaining pairs, according to the resultant value $y_{msb}$ of the convolution operation on the first input feature map batch 710. Thus, although the input feature map 700 is divided into the plurality of input feature map batches, the efficiency of operations may be maintained while also using approaches for managing the batching process in an efficient manner.

Figure 8:
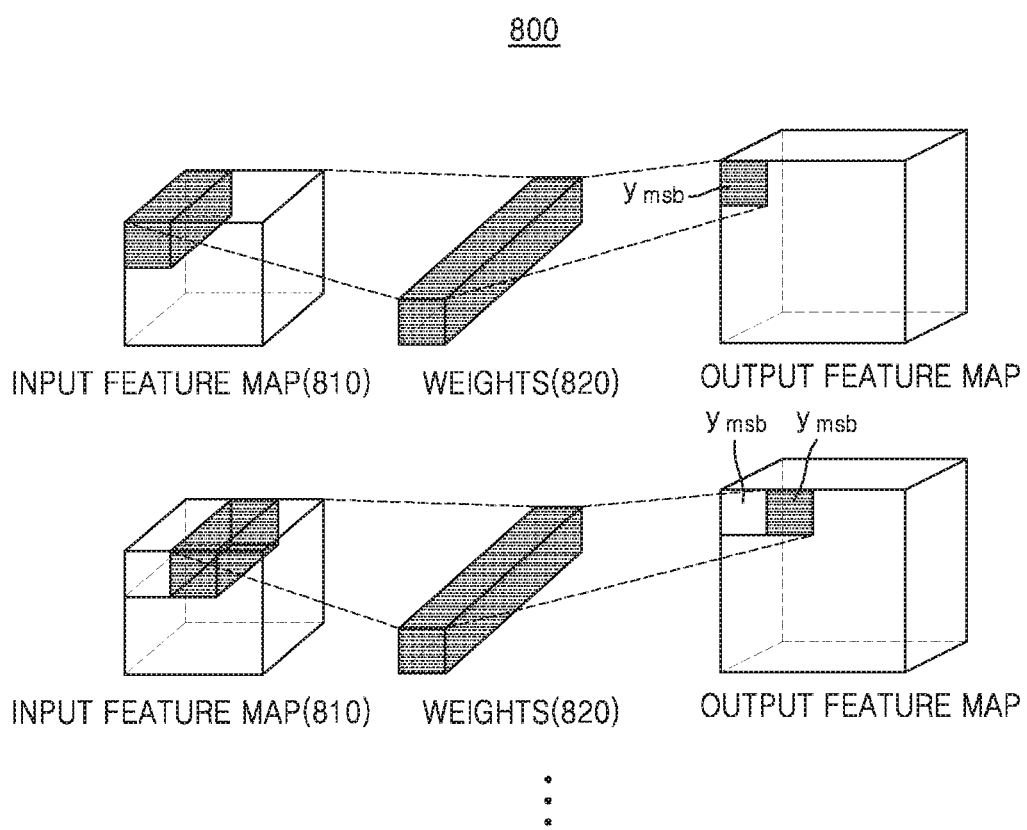
FIG. 8 is a view illustrating an example of performing convolution operations between an input feature map and weights corresponding to the input feature by a pipeline method.

FIG. 8 is a view illustrating an example of performing convolution operations between an input feature map 810 and weights 820 corresponding to the input feature map 810 by using a pipeline method 800.

In the pipeline method 800 shown in the example of FIG. 8, the input feature map 810 and the weights 820 may be computed in a sliding window manner. Pixel values of the input feature map 810 within a sliding window are respectively multiplied by the weights 820, which respectively correspond to the pixel values, and the products of the multiplications are summed, accordingly.

At this time, in each pipeline stage, the result value $y_{msb}$ of a convolution operation on first pairs that include sub-bit groups including the MSBs of pixel values in the sliding window and sub-bit groups including the MSBs of the weights 820 corresponding to the pixel values may be obtained.

When a convolution operation is performed by the pipeline method 800 as described above, the pipeline method 800 may be prevented from performing convolution operations on remaining pairs in other pipeline stages when the sum of the result value $y_{msb}$ of the convolution operation on the first pairs and the maximum value $y_{lsb,pmax}$ of the sum of the result values of the convolution operations on the remaining pairs except the first pair is less than zero. Similar principles to those discussed above apply, in that unnecessary operations may be avoided based on underlying principles about which operations may simply be avoided based on foreknowledge, as specified above.

Figure 9:
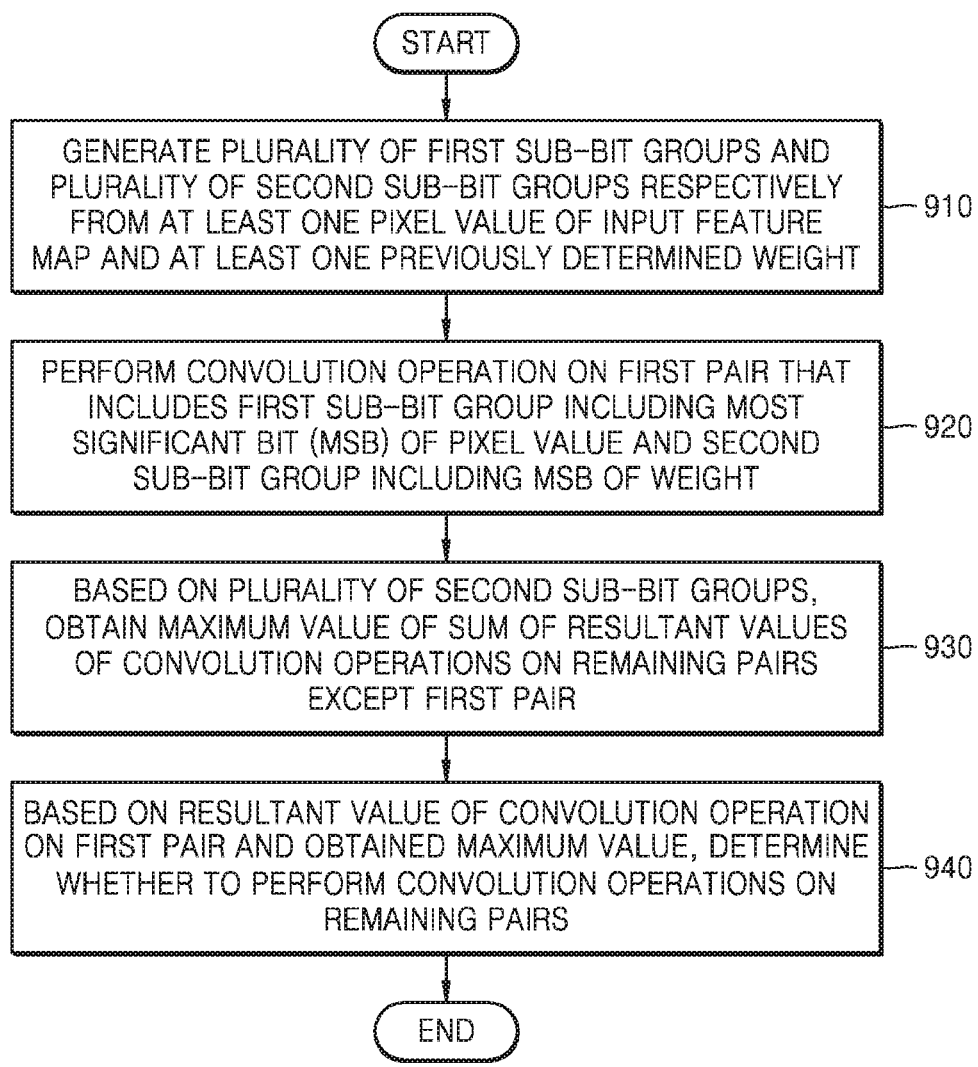
FIG. 9 is a flowchart illustrating an example of performing convolution operations in a neural network apparatus.

FIG. 9 is a flowchart illustrating an example of performing convolution operations in the neural network apparatus 300.

In operation 910, the neural network apparatus 300 may generate a plurality of first sub-bit groups and a plurality of second sub-bit groups, respectively, from at least one pixel value of an input feature map and at least one previously determined weight. The neural network apparatus 300 may divide at least one pixel value into k-bit units, where k is an arbitrary natural number, to generate N sub-bit groups, where N is an arbitrary natural number, and may divide at least one weight into k-bit units to generate M sub-bits groups, where M is an arbitrary natural number.

In operation 920, the neural network apparatus 300 may perform a convolution operation on a first pair that includes a first sub-bit group including the MSB of the at least one pixel value and a second sub-bit group including the MSB of the at least one weight. The neural network apparatus 300 may obtain the resultant value $y_{msb}$ of the convolution operation on the first pair by adding up all the resultant values of multiplications between a sub-bit group including the MSB of an arbitrary i-th pixel value $X_i$ of L pixel values of the input feature map and a sub-bit group including the MSB of an arbitrary i-th weight $W_i$ of L weights.

In operation 930, based on a plurality of second sub-bit groups, the neural network apparatus 300 may obtain the maximum value of the sum of resultant values of convolution operations on the remaining pairs except for the first pair. The maximum value may be previously calculated and stored in the memory 320, and the neural network apparatus 300 may obtain the previously stored maximum value from the memory 320. The maximum value may correspond to a theoretical maximum value obtainable when an operation is performed on pixel values of an arbitrary input feature map based on previously determined weights. Alternatively, the maximum value may be an experimentally obtained value, which is the maximum value of the sums of resultant values of convolution operations on remaining pairs obtained by inputting a plurality of arbitrary input feature maps to a convolution layer. While such an experimentally obtained value may not be an exact maximum value, such an experimentally obtained value may be close enough to the theoretical maximum to be a usable substitute.

In operation 940, based on the resultant value of the convolution operation on the first pair and the obtained maximum value, such as the theoretical and experiment maximum values discussed above, the neural network apparatus 300 may determine whether to perform convolution operations on the remaining pairs. The neural network apparatus 300 may calculate the sum of the resultant value $y_{msb}$ of the convolution operation on the first pair and the maximum value $y_{lsb,pmax}$ of the sum of the resultant values of the convolution operations on the remaining pairs.

When the resultant value $y_{msb}$ of the convolution operation on the first pair is negative and the sum of the resultant value $y_{msb}$ and the maximum value $y_{lsb,pmax}$ is less than zero, the final resultant value of the convolution operations may be less than zero. Thus, the neural network apparatus 300 may output zero without performing convolution operations on the remaining pairs. Such reduction of convolution operations may be in keeping with related processing reductions discussed above because of the ability to immediately conclude that certain calculations may immediately or more immediately be determined unnecessary. In this example, the amount of convolution operations in a neural network may be reduced at a ratio of $1/(N*M)$, where N and M are numbers of sub-bit groups as discussed, above.

When the resultant value $y_{msb}$ of the convolution operation on the first pair is negative and the sum of the resultant value $y_{msb}$ and the maximum value $y_{lsb,pmax}$ is greater than zero, the neural network apparatus 300 may perform convolution operations on the remaining pairs and may output the sum of the resultant value $y_{msb}$ of the convolution operation on the first pair and the resultant values of the convolution operations on the remaining pairs. In addition, when the resultant value $y_{msb}$ of the convolution operation on the first pair is positive, the neural network apparatus 300 may perform convolution operations on the remaining pairs regardless of the maximum value $y_{lsb,pmax}$.

The processors, memories, neural network apparatuses, neural network apparatus 300, processor 310, and memory 320 with respect to FIGS. 1-9 are hardware components configured to perform the operations described in this application. Examples of hardware components that may be used to perform the operations described in this application, where appropriate, include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media.

Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

In the present specification, the term "module" may be a hardware component such as a processor or a circuit, and/or a software component executable by a hardware component such as a processor.

The description of the present disclosure is for illustrative purposes only, and it will be understood by those of ordinary skill in the art that modifications and changes in form may be made without departing from the technical ideas and essential features of the present disclosure. Therefore, the above-described embodiments should be considered in a descriptive sense only and not for purposes of limitation. For example, each constituent part described above may be provided in a distributed manner, and parts described above as being distributed may be provided in a combined form.

The scope of the embodiments is defined by the following claims, and it should be construed that all modifications or changes made within the meaning and scope of the claims and equivalents thereof are within the scope of the present disclosure.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of performing convolution operations in a neural network, the method comprising:
    generating a plurality of first sub-bit groups and a plurality of second sub-bit groups, respectively from at least one pixel value of an input feature map and at least one predetermined weight;
    performing a convolution operation on a first pair that includes a first sub-bit group including a most significant bit (MSB) of the at least one pixel value and a second sub-bit group including an MSB of the at least one predetermined weight;
    based on the plurality of second sub-bit groups, obtaining a maximum value of a sum of results for convolution operations of remaining pairs excepting the first pair; and
    based on a result of the convolution operation on the first pair and the maximum value, determining whether to perform the convolution operations of the remaining pairs.

2. The method of claim 1, wherein, in response to the result of the convolution operation on the first pair being positive, the convolution operations of the remaining pairs are performed regardless of the maximum value.

3. The method of claim 1, wherein, in response to the result of the convolution operation on the first pair being negative and a sum of the maximum value and the result of the convolution operation on the first pair being less than zero, the determining comprises outputting zero, without performing the convolution operations on the remaining pairs, as a result of the convolution operations on the remaining pairs.

4. The method of claim 1, wherein, in response to the result of the convolution operation on the first pair being negative and a sum of the maximum value and the result of the convolution operation on the first pair being greater than zero, the determining comprises:
    performing the convolution operations of the remaining pairs; and
    outputting a sum of the result of the convolution operation on the first pair and results of the convolution operations of the remaining pairs.

5. The method of claim 1, wherein, in response to a value corresponding to the second sub-bit group including the MSB of the at least one predetermined weight being positive, the maximum value comprises a result of a first operation between the second sub-bit group including the MSB of the at least one predetermined weight and a maximum of values corresponding to a remainder of the plurality of first sub-bit groups excepting the first sub-bit group including the MSB of the at least one pixel value.

6. The method of claim 5, wherein the maximum value further comprises a result of a second operation between a maximum value of values corresponding to the plurality of first sub-bit groups and a remainder of the plurality of second sub-bit groups excepting the second sub-bit group including the MSB of the at least one predetermined weight.

7. The method of claim 1, wherein the generating comprises:
    generating N first sub-bit groups by dividing the at least one pixel value into k-bit units, where k and N respectively refer to arbitrary natural numbers; and
    generating M second sub-bit groups by dividing the at least one predetermined weight into k-bit units, where M refers to an arbitrary natural number.

8. The method of claim 1, wherein the at least one predetermined weight is represented in two's complement fixed point format.

9. The method of claim 1, wherein, in response to the input feature map including a plurality of input feature map batches, the method further comprises adjusting the plurality of input feature map batches such that first sub-bit groups including MSBs of pixel values of the plurality of input feature map batches form one of the plurality of input feature map batches.

10. The method of claim 9, wherein the batches of the plurality of input feature map batches are generated by dividing the input feature map in a channel direction.

11. A non-transitory computer-readable storage medium storing instructions that, when executed by a processor, cause the processor to perform the method of claim 1.

12. An apparatus for performing convolution operations in a neural network, the apparatus comprising:
    one or more processors; and
    a memory storing instructions, which when executed by the one or more processors configure the one or more processors to:
        generate a plurality of first sub-bit groups and a plurality of second sub-bit groups, respectively from at least one pixel value of an input feature map and at least one predetermined weight;

perform a convolution operation on a first pair that includes a first sub-bit group including a most significant bit (MSB) of the at least one pixel value and a second sub-bit group including an MSB of the at least one predetermined weight;

based on the plurality of second sub-bit groups, obtain a maximum value of a sum of results for convolution operations of remaining pairs excepting the first pair; and based on a result of the convolution operation on the first pair and the maximum value, determine whether to perform the convolution operations of the remaining pairs.

13. The apparatus of claim 12, wherein, in response to the result of the convolution operation on the first pair being positive, the one or more processors are configured to perform the convolution operations of the remaining pairs regardless of the maximum value.

14. The apparatus of claim 12, wherein, in response to the result of the convolution operation on the first pair being negative and a sum of the maximum value and the result of the convolution operation on the first pair being less than zero, the one or more processors are configured to output zero, without performing the convolution operations on the remaining pairs, as a result of the convolution operations on the remaining pairs.

15. The apparatus of claim 12, wherein, in response to the result of the convolution operation on the first pair being negative and a sum of the maximum value and the result of the convolution operation on the first pair being greater than zero, the one or more processors are configured to
   perform the convolution operations of the remaining pairs, and
   output a sum of the result of the convolution operation on the first pair and results of the convolution operations of the remaining pairs.

16. The apparatus of claim 12, wherein, in response to a value corresponding to the second sub-bit group including the MSB of the at least one predetermined weight being positive, the maximum value comprises a result of a first operation between the second sub-bit group including the MSB of the at least one predetermined weight and a maximum of values corresponding to a remainder of the plurality of first sub-bit groups excepting the first sub-bit group including the MSB of the at least one pixel value.

17. The apparatus of claim 16, wherein the maximum value further comprises a result of a second operation between a maximum value of values corresponding to the plurality of first sub-bit groups and a remainder of the plurality of second sub-bit groups excepting the second sub-bit group including the MSB of the at least one predetermined weight.

18. The apparatus of claim 12, wherein the one or more processors are configured to generate N first sub-bit groups by dividing the at least one pixel value into k-bit units, where k and N respectively refer to arbitrary natural numbers, and to generate M second sub-bit groups by diving the at least one predetermined weight into k-bit units, where M refers to an arbitrary natural number.

19. The apparatus of claim 12, wherein the at least one predetermined weight is represented in two's complement fixed point format.

20. The apparatus of claim 12, wherein, in response to the input feature map including a plurality of input feature map batches, the one or more processors are further configured to adjust the plurality of input feature map batches such that first sub-bit groups including MSBs of pixel values of the plurality of input feature map batches form one of the plurality of input feature map batches.

* * * * *